(No Model.)
C. BIRKERY & H. S. LORD.
WATER CLOSET VALVE.
No. 272,196. Patented Feb. 13, 1883.
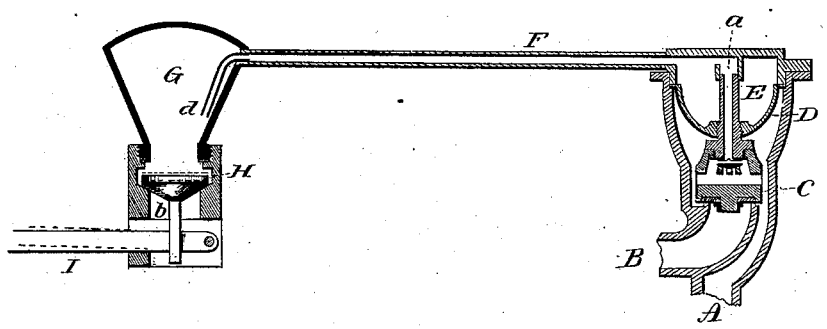
Witnesses:
Cornelius Birkery & Henry S. Lord, Inventors.
By atty.

UNITED STATES PATENT OFFICE.

CORNELIUS BIRKERY AND HENRY S. LORD, OF HARTFORD, CONNECTICUT, ASSIGNORS TO THE HARTFORD SANITARY PLUMBING COMPANY, OF SAME PLACE.

WATER-CLOSET VALVE.

SPECIFICATION forming part of Letters Patent No. 272,196, dated February 13, 1883.

Application filed August 18, 1882. (No model.)

*To all whom it may concern:*

Be it known that we, CORNELIUS BIRKERY and HENRY S. LORD, of Hartford, in the county of Hartford and State of Connecticut, have invented a new Improvement in Water-Closet Valves; and we do hereby declare the following, when taken in connection with accompanying drawing and the letters of reference marked thereon, to be a full, clear, and exact description of the same, and which said drawing constitutes part of this specification, and represents a vertical central section.

This invention relates to an improvement in that class of valves for water-closets which is designed to operate automatically to regulate the flow or quantity of water admitted to the bowl for flushing purposes—that is to say, the quantity or time of the flow after the bowl shall have been opened and closed—and particularly to that class which employs a valve hung to a diaphragm, with a small aperture through the water-way to a chamber on the side of the diaphragm opposite the valve, so as to produce an equilibrium on the diaphragm, which closes the valve. Then when that equilibrium is removed, by permitting the water on the said opposite side of the diaphragm to escape, the valve opens for a large flow of water to the bowl, a very small portion of the water escaping to the opposite side of the diaphragm until this small quantity has produced the equilibrium to close the valve. The time of flow of water to the bowl is therefore the time between breaking and restoring the equilibrium. Usually a valve has been employed in the waste-passage from the chamber on the opposite side of the diaphragm to close the escape, and thereby reproduce the equilibrium. This valve is necessarily small and liable to be choked by foreign substances in the water, which will prevent the valve from perfectly closing, and which will prevent the restoring of the equilibrium, because the small quantity of water admitted to that side of the diaphragm escapes.

The object of our invention is to overcome this difficulty; and the invention consists in the arrangement of a water-chamber or combined air and water chamber, in connection with the chamber on that side of the diaphragm opposite the valve, combined with a valve in said chamber, in connection with the pull which opens the flow from the bowl, whereby the water in said water-chamber will be instantly discharged and break the equilibrium to cause the flow of water to the bowl. The passage from the chamber closed when the pull is dropped, the equilibrium will be restored by the flow of water through the diaphragm into said water-chamber, as more fully hereinafter described.

A represents the inflow water-passage, and B the outflow to the bowl. The outflow-passage is closed by a valve, C, hung to a diaphragm, D, which forms a chamber, E, on the side opposite the valve. Through the diaphragm, or valve-stem, which is the same thing, is a small water-passage, *a*, very much less in extent than the opening through the valve-seat into the passage B. Hence, when the valve C is raised, water flows freely through the passage A and passage B to the bowl, a portion of it escaping through the small passage *a* to the opposite side of the diaphragm, and so that if the outflow from the chamber E above the diaphragm be arrested that chamber will be gradually filled by the water flowing through the passage *a* until an equilibrium is produced, when the valve will be closed. The valve C is again opened by breaking that equilibrium. This is a well-known valve arrangement for water-closets.

From the chamber E is an escape-passage, F, for the water from that chamber E, for the purpose of breaking the equilibrium. It is in this passage that the small stop-valve has heretofore been arranged. Instead of employing such a valve, we arrange a water-chamber, G, in size corresponding to the amount of water which may flow through the aperture *a* in the time fixed for the proper flushing or flow of water to the bowl.

In the lower part of the chamber G is a valve, H, which fits closely upon a seat, and in connection with the lever I, which operates the pan of the bowl or opens the wasteway in connection therewith, so that when the pull is drawn up, as in broken lines, it will raise the valve H, but when the pull is dropped the valve H will be drawn to its seat. Below the valve H is a wasteway, b, for the water which may flow from the chamber G when the valve is opened.

To illustrate the operation of our invention, suppose the valve C to be closed, the water-chamber G and the chamber above the diaphragm to be filled with water, so as to produce the required equilibrium to hold the valve C closed. Then when the pull is drawn up, or the wasteway from the closet opened, the valve H will be raised, opening a large passage for the escape of the water from the chamber G. This rapid escape instantly breaks the equilibrium, and the valve C rises to open the flow to the bowl, and also through the small aperture a to the chamber G. This flow through the chamber G will continue so long as the waste from the bowl is held open and until the valve H is closed. So soon as the pull is dropped or the wasteway closed the valve H drops upon its seat and closes the escape from the chamber G. The flow will then continue through the passage to the bowl, and through the passage a, until the water-chamber G and the chamber above the diaphragm are filled to the water-pressure. Then the equilibrium will be restored and the valve C closed. The time in which the flow to the bowl will be continued after the pull is dropped or wasteway closed will depend upon the size of the chamber G. If that be smaller, the time will be shorter, but if it be greater the time will be longer. The time may therefore be regulated by applying different-sized chambers G, or the chamber itself may be made adjustable, or passage into the chamber G.

In order to avoid the "water-hammer," the discharge F is continued into the chamber and down toward the bottom, as at d, so that the discharge into the chamber G will be below its highest point. So soon, then, as the water has risen in the chamber G to the end of the discharge d, from that time the air in the chamber G above the surface of the water will be gradually compressed and form an air-cushion upon the water, which will check the so sudden closing of the valve as to produce what is called "water-hammer," or return of air in the chamber through the water, so as to produce "gurgling." This chamber G then serves the double purpose of regulating the flow of water to the bowl, and also as an air-chamber to prevent "water-hammer."

While we have described the opening of the wasteway as by a pull, yet any of the known devices for opening the flow may be employed, it only being essential that such devices shall be connected to the valve H, so that in opening the flow from the closet it will also open the valve H.

Instead of the diaphragm, any of the known valves which operate upon this principle of producing an equilibrium by a small passage from the valve-chamber to a point opposite the valve, so as to produce an equilibrium, may be employed. We therefore do not limit our invention to this particular construction of water-closet valve. The device for operating the valve in the water-chamber should be operated at the same time as the pull-up or opening of the waste-valve. Hence we connect them together, or so arrange them that they may be conveniently operated at or about the same time; but they may be independent each of the other. By the term "connection," as herein used, between the two, we therefore wish to be understood as meaning that there shall be a device for operating both the flow or pull and the valve in the water-chamber; but they may be independent one of the other.

We claim—

1. In an apparatus for flushing water-closets, the combination of a valve arranged to close the passage to the basin, a water-way leading from the supply onto the said valve, a chamber, E, above the said valve, the said water-way constructed with an aperture leading to said chamber E, said aperture being considerably smaller than the said water-way, with a water-chamber, G, in connection with the said chamber E, and a valve arranged to open the waste-passage from said water-chamber G, and mechanism, substantially such as described, to open said water-chamber valve, substantially as specified.

2. In an apparatus for flushing water-closets, the combination of a valve arranged to close the passage to the basin, a water-way leading from the supply onto the said valve, a chamber, E, above the said valve, the said water-way constructed with an aperture leading to said chamber E, said aperture being considerably smaller than the said water-way, with a water-chamber, G, in connection with the said chamber E, and a valve arranged to open the waste-passage from said water-chamber G, and mechanism, substantially such as described, to open said water-chamber valve, the opening from the said chamber E into the said water-chamber G arranged at a point below the top of said water-chamber, substantially as described.

CORNELIUS BIRKERY.
HENRY S. LORD.

Witnesses:
JOHN C. ABBOT,
LOUIS A. TRACY.